US005995351A

United States Patent [19]

Katsumata et al.

[11] Patent Number: 5,995,351

[45] Date of Patent: Nov. 30, 1999

[54] MOTOR PROTECTOR DEVICE

[75] Inventors: Hiromi Katsumata, Gotemba; Kenichiro Miura, Otsu; Yuji Mori, Kyoto, all of Japan

[73] Assignee: Texas Instruments Incorporated, Dallas, Tex.

[21] Appl. No.: 09/036,664

[22] Filed: Mar. 4, 1998

[30] Foreign Application Priority Data

Mar. 6, 1997 [JP] Japan .................................... 9-069146
Nov. 21, 1997 [JP] Japan .................................... 9-337862

[51] Int. Cl.[6] .................................................. H02H 5/04

[52] U.S. Cl. ........................... 361/105; 361/24; 361/104; 361/26

[58] Field of Search ........................... 361/23, 24, 25–27, 361/31, 32, 103–106; 337/298, 300, 333, 338, 365

[56] References Cited

U.S. PATENT DOCUMENTS

| | | | |
|---|---|---|---|
| 5,303,143 | 4/1994 | Sommer et al. | 361/23 |
| 5,515,229 | 5/1996 | Takeda | 361/105 |
| 5,627,506 | 5/1997 | Suzuki | 337/298 |

*Primary Examiner*—Jeffrey Gaffin
*Assistant Examiner*—Kim Huynh
*Attorney, Agent, or Firm*—Russell E. Baumann; Richard L. Donaldson

[57] ABSTRACT

A motor protector (1, 1A) for connection in a circuit for supplying electrical power to a motor (36) to be protected includes first (S1), second (S2) and third (S3) switches in a housing member (2, 3). Each switch (S1, S2, S3) uses a snap-acting bimetallic member (8, 11, 13) for opening and closing electrical contacts (4*a* and 5*a*, 8*a* and 8*b*; 17 and 27; 18 and 30) of the respective switch. The switches (S1, S2, S3) in the housing member (2, 3) are connected as part of the circuit supplying electrical power to the motor (36) being electrically connected in series with one another so that the opening of any one of them will stop the flow of power to the motor (36) to be protected.

14 Claims, 11 Drawing Sheets

MOTOR PROTECTOR DEVICE

FIELD OF THE INVENTION:

This invention relates to a motor protector for the protection of the motor of a compressor which can be used, for example, in air conditioners, refrigerators, etc.

BACKGROUND OF THE INVENTION

Typically, in a motor used in a compressor of an air conditioner, a motor protector is provided for sensing abnormal heat generation or extraordinary electric current that would be produced in the case where the rotor of the motor has been restrained or where an excessive load has been added to the rotor.

Such a motor protector 101 as is known in the art is shown in FIG. 18. This motor protector 101 has an adjusting screw 103 centrally located in an open ended cylindrically shaped base 102 typically made of an electrically insulating material such as resin. A disk-shaped snap acting bimetal disk shaped element 104 is installed at one end of adjusting screw 103 internal to base 102 with movable contacts 105 and 106 mounted at both edges of the bimetal disk 104.

A pair of fixed contacts 107 and 108 are positioned near an inner wall of base 102 so as to be able to contact the movable contacts 105 and 106. One of the fixed contacts 107 is connected to a heater 109 which in turn is connected to connecting terminal 110. The protector is positioned so that in an electrical circuit providing electric current to a motor (not shown), the current will flow from the fixed contact 108 to a connecting terminal 110 through the bimetal disk 104, fixed contact 107 and heater 109.

When the rotor of the motor has been restrained by some reason or when an excessive load has been added to the rotor of the motor, the ambient temperature surrounding protector 101 rises and/or an excessive current (which is greater than normal) flows through the bimetal disk 104 which results in the bimetal disk 104 increasing in temperature and snapping over as is shown (dotted lines) in FIG. 18. In such conditions, the movable contacts 105 and 106 and the fixed contacts 107 and 108 separate and the power supplied to the motor is cut off thereby protecting the motor.

Such a protector has proven very useful in operation, however, there are certain instances when an improved motor protector device would be desirable.

For example, in conventional motor protector 101, only one bimetal element (one switch) is used to effect protection, both at the time when the rotor has been restrained or at the time of an excessive load, thereby requiring the temperature for the snap-action of the bimetal 104 to be set at a high temperature level (in the range between 140 and 160 degrees centigrade).

Also, in the case of the prior art motor protector used with the motor of a compressor of an air conditioner, etc., the elevation of the temperature of the motor stemming from a leakage of the cooling gas is not detected thereby possibly causing problems with protection of the motor.

Still further, in motor protector 101 of the prior art, if the fixed contacts 107 and 108 and the moving contacts 105 and 106 are welded together by electrical arcing and melting of the contact material, the electric current will not be cut off to the motor even in the case where the rotor is restrained thereby creating a potentially dangerous situation. Also, there is a possibility of bimetal disk 104 no longer performing its function as it comes to the end of its mechanical life which could create a dangerous situation.

SUMMARY OF THE INVENTION

An object of this invention is to solve the problems of the conventional type protector device by providing a motor protector capable of protecting the motor by detecting not only a restraint on the motor rotor or an overload condition but also a fault due to leakage of the cooling gas.

Another object of this invention lies in offering a motor protector capable of avoiding a dangerous state when the contacts have been joined by melting or the bimetal element is no longer functioning.

Accordingly, one aspect of the present invention is a motor protector connected in a circuit for supplying electrical power to a motor comprising a first switch including an actuation means, said first switch connected in said circuit for supplying power to a motor and upon movement of said actuation means, the first switch opening and closing said circuit, a second switch connected in said circuit for supplying power to the motor including an actuation means for opening and closing said circuit and a third switch connected in said circuit for supplying electrical power to said motor including an actuation means for opening and closing said circuit, said first, second and third switches being electrically connected in series.

In another aspect of the motor protector of the present invention, the actuation means of the first, second and third switches are snap-acting bimetallic members responsive to temperature each with a selected predetermined first temperature at which it snaps over center and a second lower selected predetermined temperature in which it snaps back to its original state, the snap acting bimetallic member of the first switch being a current carrying member of the circuit for supplying current to the motor so that it is responsive to environmental temperature surrounding it and amount of current passing through it and the snap-acting bimetallic members of the second and third switch not being current carrying members of the circuit for supplying current to the motor and each having different first and second selected predetermined snap temperatures with the first selected predetermined snap temperature for the bimetallic member of the third switch being higher than that of the bimetallic member of the second switch and second selected predetermined snap temperature for the bimetallic member of the third switch being below the temperature of the motor protector during normal operation of the motor to be protected.

In still another aspect of the motor protector of the present invention, first, second and third switches are all contained in a housing or casing with the first switch being associated with an upper first base member of the housing, the second and third switches being associated with a lower second base member.

In yet still another aspect of the motor protector of this invention, second and third switches are positioned in the housing closer to motor to be protected than switch one.

In still another aspect of a motor protector in accordance with this invention, the third switch connected in said circuit for supplying electrical power to the motor to be protected includes a meltable fuse member as the actuation means for opening said circuit.

BRIEF DESCRIPTION OF THE DRAWINGS

Other objects, advantages and details of the motor protector device of this invention appear in the following description of the preferred embodiments of the invention, the detailed description referring to the drawings in which.

DESCRIPTION OF THE PREFERRED EMBODIMENTS

The embodiments of the motor protector according to this invention will be explained below in detail by referring to FIGS. 1 through 17.

The motor protector described in these embodiments below, by way of example, is of the type used in the compressor for an air conditioner, etc. Typically, it is directly installed on the outer wall of the main body of a compressor.

Figure 1:
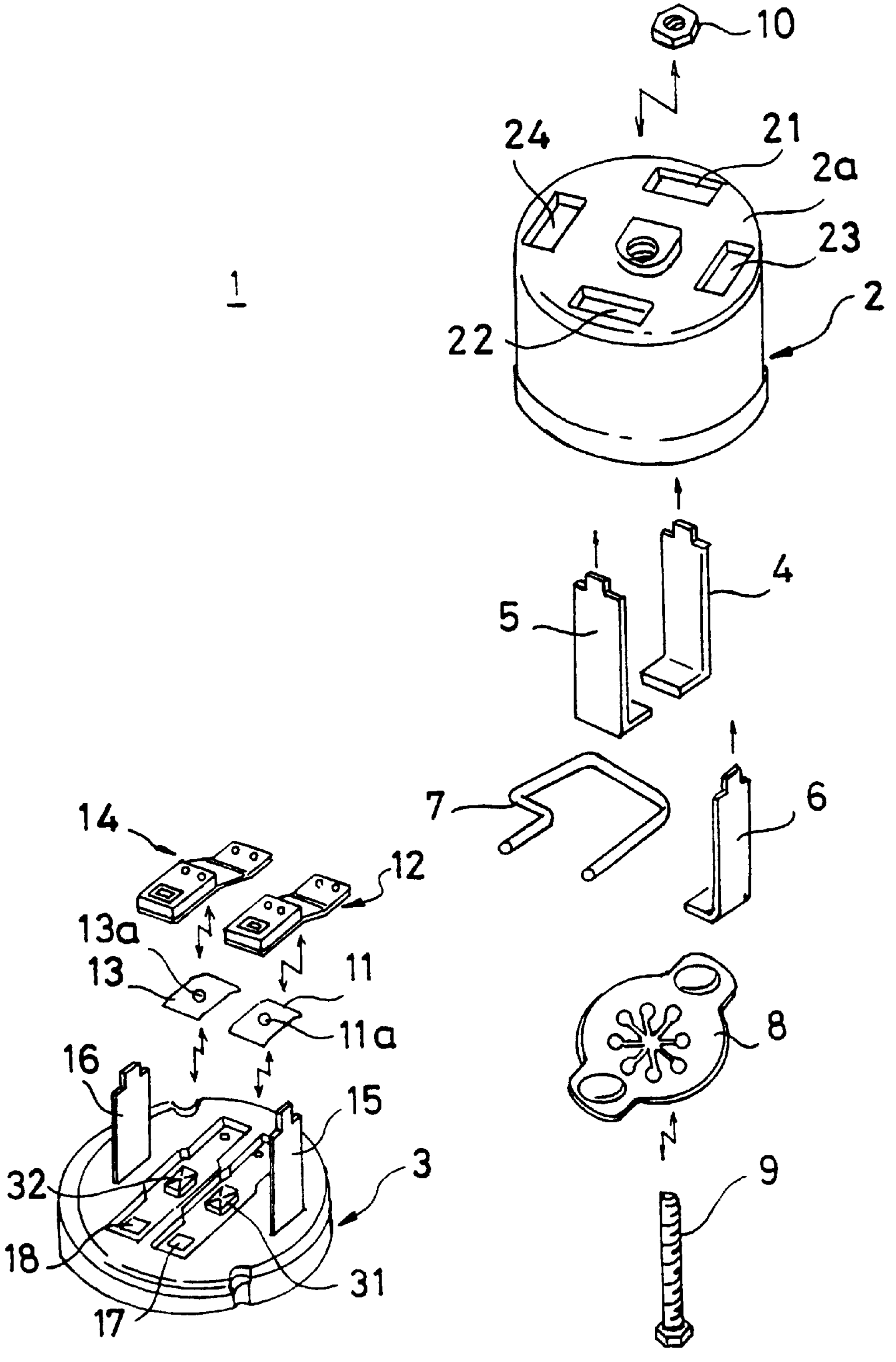
FIG. 1 is an exploded oblique view of assembly of a first embodiment of a motor protector device of the present invention.

FIG. 1 is an oblique view of the assembly for a first embodiment of a motor protector 1 according to this invention.

In motor protector 1 as described in this embodiment, the casing is composed of a first base 2 and a second bottom base 3 as is shown in FIG. 1. The first and second bases 2 and 3 are made from electrically insulating material such a resinous material as polyester and are constructed in such a way as to be freely detachable with one another.

Figure 18:
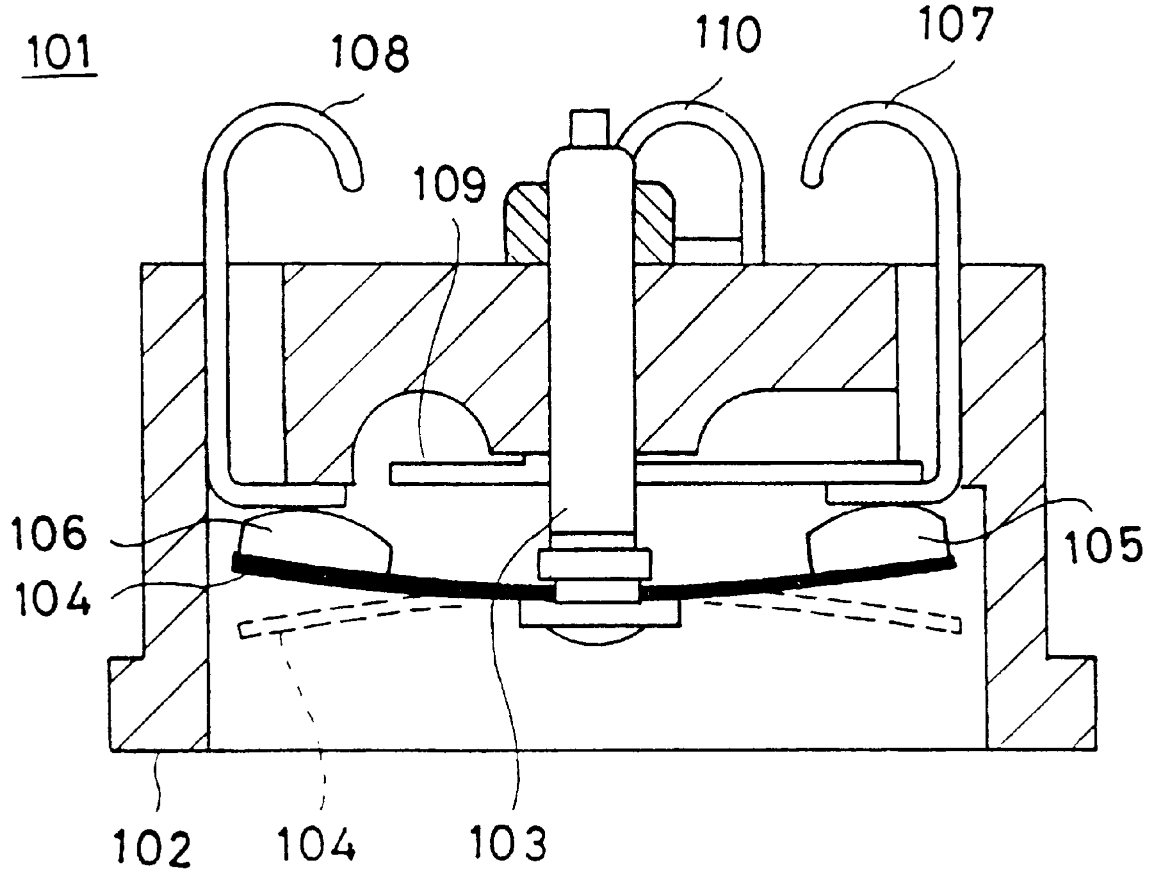
PRIOR ART FIG. 18
FIG. 18 is a cross-sectional view of motor protector according to the prior art.

A first switch S1 which opens or closes in conformity with the size of the electric current that flows through it and the temperature of the atmosphere/environment surrounding it is provided in first base 2. This first switch S1 has the same construction as the conventional motor protector 101 as described earlier and shown in FIG. 18.

The first base 2 is made of a cylindrically shaped member having a top 2*a* where four holes 21, 22, 23 and 24 are provided at equal distance from one another for receiving the connecting terminals 4, 5, 6, 15 and 16. These terminals protrude from the four holes in top 2*a*. Longitudinal planar connecting terminals 4, 5 and 6 are made of a metal, and by way of example, inserted respectively into holes 21, 22 and 23.

In the first base 2, moreover, a bimetal disk 8 is provided as the active part of first switch S1 in addition to a heater 7. This bimetal disk 8 is fixed to the first base 2 by means of an adjusting screw 9 and a nut 10. It is to be understood that the heater 7 is not an essential constituent for motor protector 1.

Second base 3 generally of a disk shape has a second switch S2 and a third switch S3 associated with it. These switches open or close in response to the temperature of the surrounding atmosphere. Switch S2 generally comprises a fixed contact 17, a bimetal disk 11 and a movable arm 12; and Switch S3 generally comprises a fixed contact 18, a bimetal disk 13 and a movable arm 14. Additionally, on second base 3, two connecting terminals 15 and 16 are provided and extend vertically upward from base member 3 toward first base member 2. In the assembled state, protector 1 has first base 2 and second base 3 joined together by any one of various techniques as are known in that art such as a screw or snap fit action.

Figure 2:
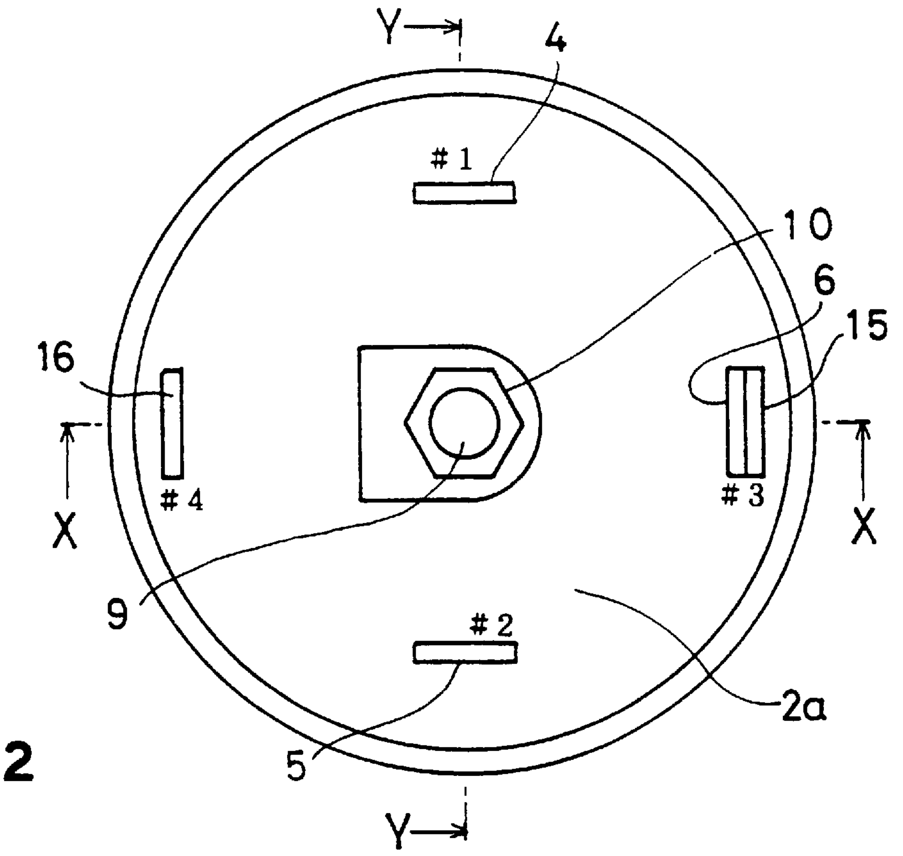
FIG. 2 is a top view of the assembled motor protector of FIG. 1.
Figure 3:
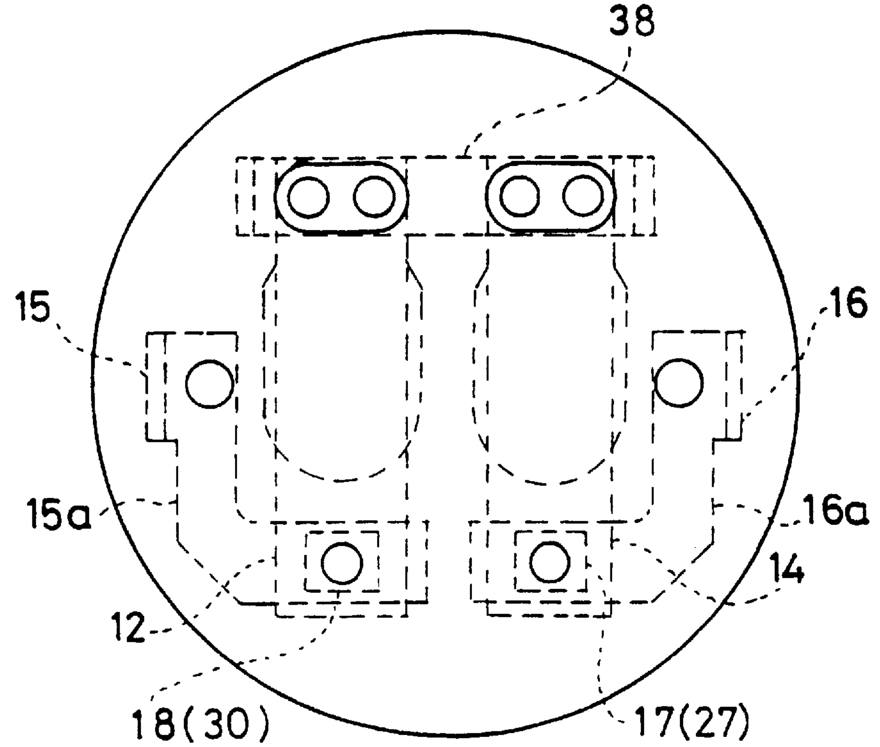
FIG. 3 is a bottom view of the assembled motor protector of FIG. 1.

FIG. 2 shows an external view of motor protector 1 as described in this first embodiment as viewed from the top of first base 2 and FIG. 3 is an external view of motor protector 1 as viewed from the bottom of second base 3.

Figure 4:
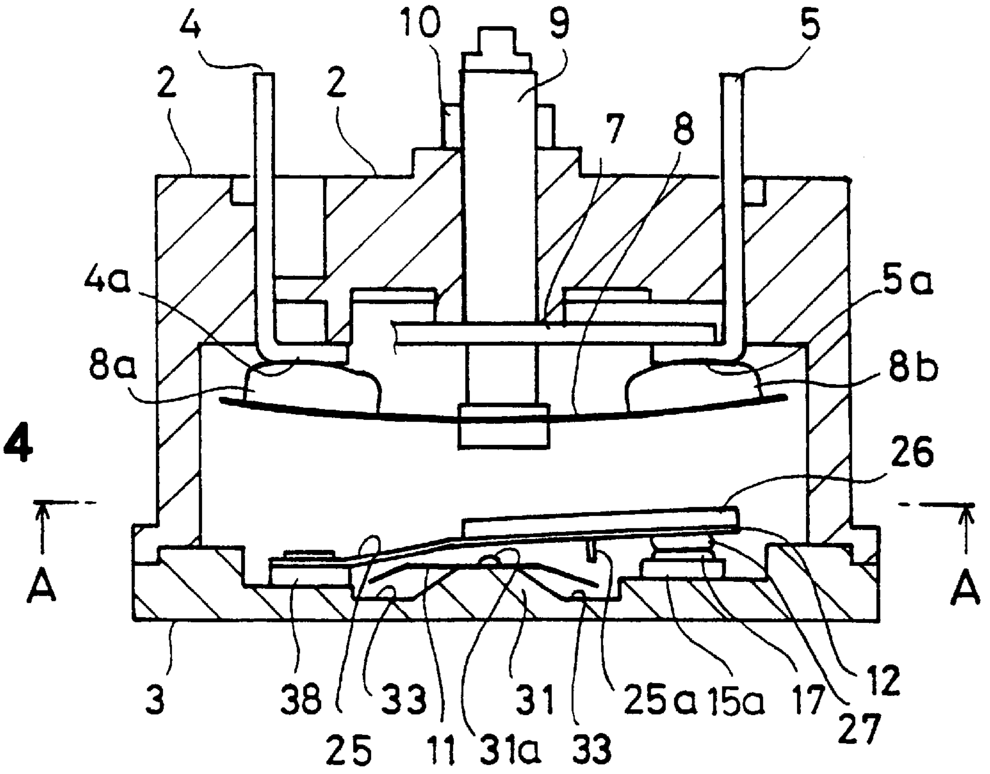
FIG. 4 is a cross-sectional view cut along line Y—Y of FIG. 2.
Figure 5:
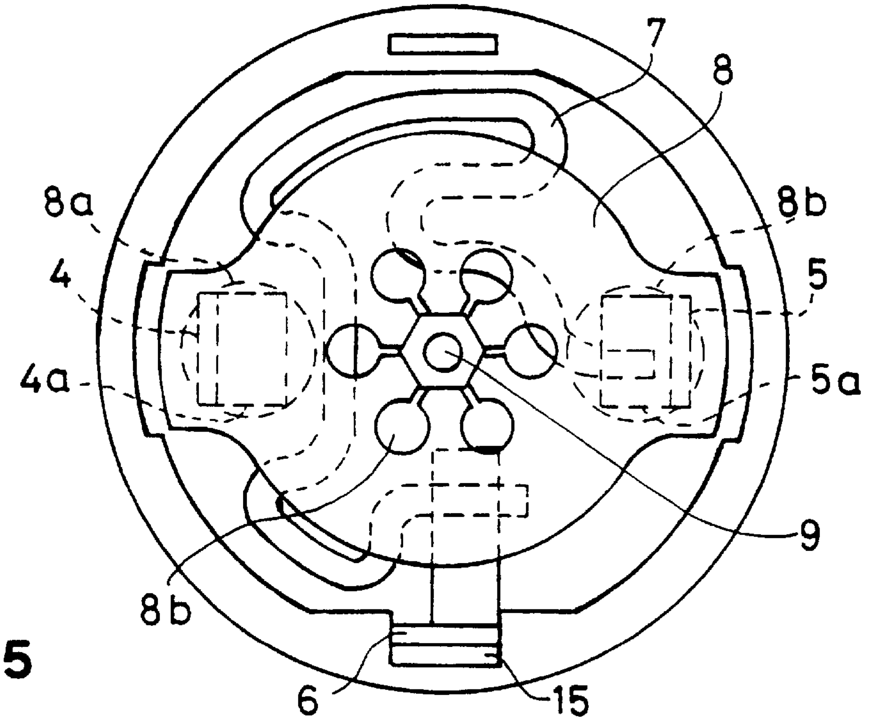
FIG. 5 is a cross-sectional view cut along line A—A of FIG. 4.
Figure 6:
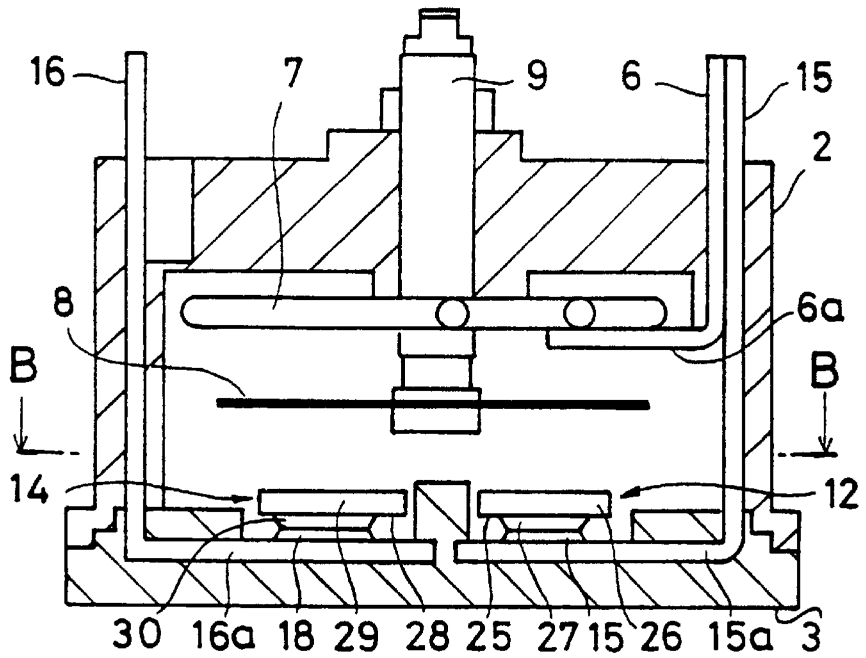
FIG. 6 is a cross-sectional view cut along line X—X of FIG. 2.
Figure 7:
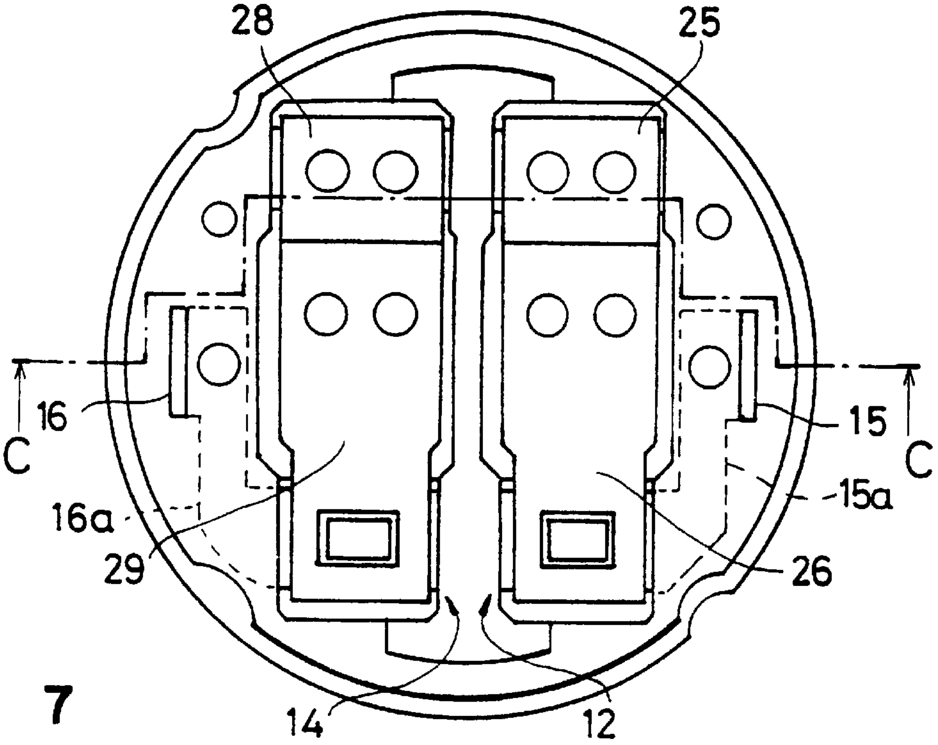
FIG. 7 is a cross-sectional view cut along line B—B of FIG. 6.
Figure 8:
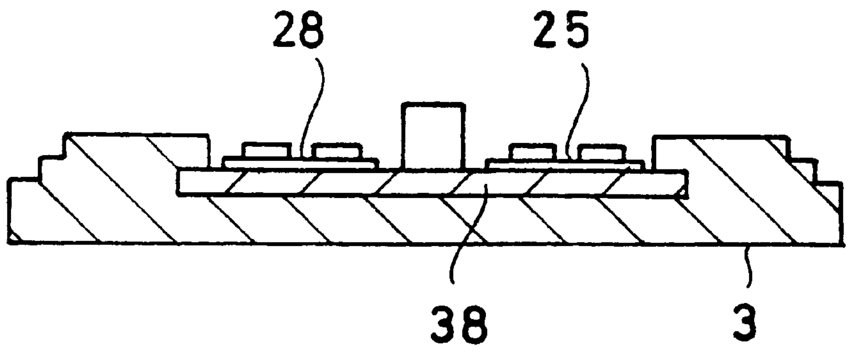
FIG. 8 is a cross-sectional view cut along line C—C of FIG. 7.
Figure 9:
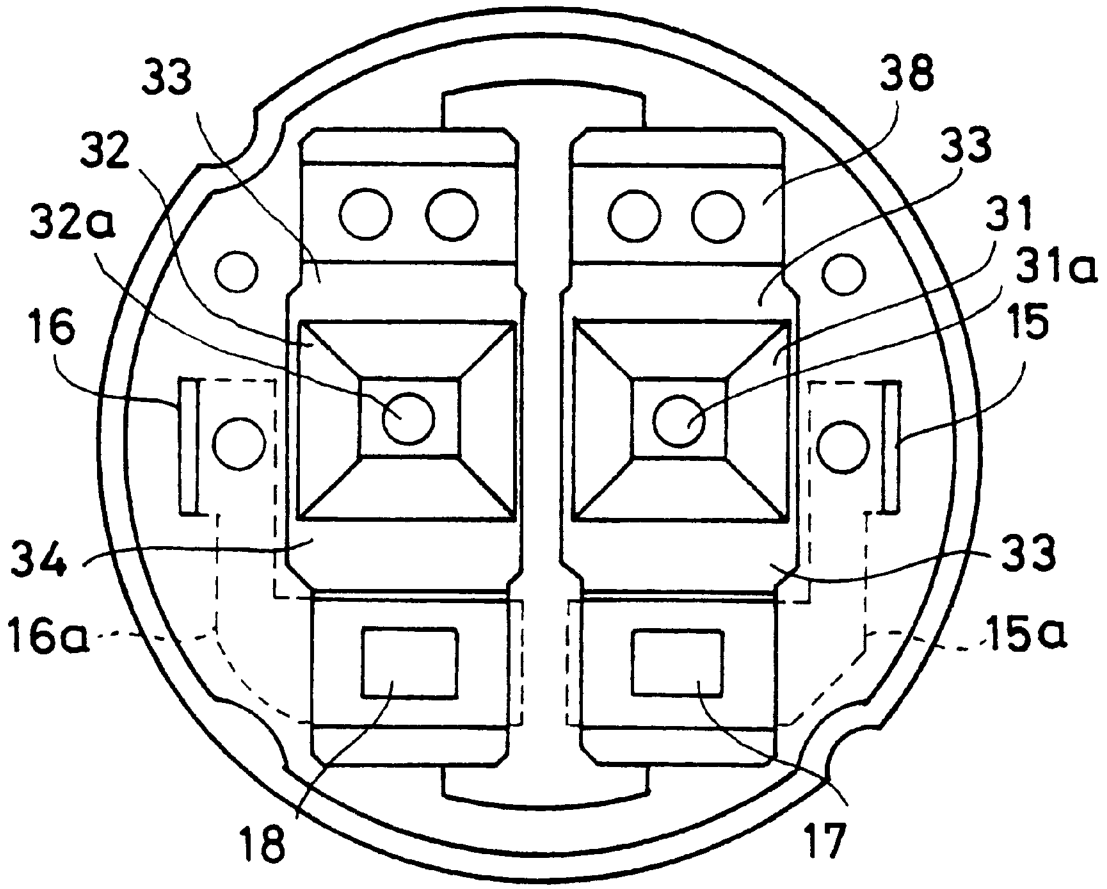
FIG. 9 is a planar view of the second base of FIG. 1 in which the bimetal disks and movable arms have not been installed.

In addition, FIG. 4 is a cross-section cut along line Y—Y of FIG. 2, FIG. 5 is a cross-section cut along line A—A of FIG. 4, FIG. 6 is a cross-section cut along line X—X of FIG. 2, FIG. 7 is a cross section cut along line B—B of FIG. 6, FIG. 8 is a cross-section cut along C—C of FIG. 7, and FIG. 9 is a plane figure showing second base 3 in a state without the installation of bimetal disks 11 and 13 and movable arms 12 and 14.

As mentioned above, each of connecting terminals 4, 5 and 6 are mounted in motor protector 1 in such a way that their respective tip portions protrude from top part 2*a* of first base 2 as is shown in FIGS. 2 and 5. The openings will be referenced to as terminal numbers 1–4.

Connecting terminals 4 and 5 located at the terminal numbers 1 and 2 are positioned such that a bent lower portion of each serves as fixed contacts 4*a* and 5*a* to be electrically connected with a pair of movable contacts 8*a* and 8*b* that have been arranged at two ends of bimetal disk 8.

Bimetal disk 8 is of a generally circular shape as is shown in FIG. 5 and is bent in such a way as to form a cup shape. It is installed at one end of adjusting screw 9 internal to first base 2 so that its convex surface will face second base 3.

Bimetal disk 8 is typically made by joining together two metal pieces with different thermal expansion coefficients and then forming the joined metal pieces into a cup-shaped element. Accordingly, when the temperature reaches a first prescribed level, bimetal disk 8 will snap or "turn-over" center and then return to its original configuration when it reaches a second lower prescribed level. For example, the first prescribed level for switch S1 may range between 140 and 160 degrees centigrade and the second prescribed level may range between 60 and 80 degrees centigrade. Since bimetal disk 8 is part of the electrical circuit carrying current to the motor, its temperature at any given time is determined by the level of current it carries in addition to the atmospheric temperature surrounding it. Accordingly, both the temperature surrounding the device and the current flowing through it must be considered in choosing the predetermined actuation temperature for the protector. For example, typical ambient temperature in which the protector operates is twenty-five to one hundred degrees centigrade and typical current carrying levels are five to thirty amperes.

As are shown in FIG. 5, there are generally provided a plurality of cut out parts 8*b* in bimetal disk 8 surrounding adjusting screw 9 for minimizing stress build-up that is produced due to the snap-action.

At terminal number 3 connecting terminal 6 that has been provided with first base 2 and connecting terminal 15 that has been provided with second base 3 are constructed and positioned in such a manner as to protrude together from common hole 23 that has been provided at top 2*a* of first base 2. Typically, they are joined together by means of welding or other means as is know in the art. Due to this fact, connecting terminals 6 and 15 are electrically connected.

Heater 7 for supplying heat to bimetal disk 8 is connected to connecting part 6*a* of connecting terminal 6 and fixed contact 5*a* of connecting terminal 5.

As are shown in FIGS. 6, 7 and 9, connecting terminals 15 and 16 are fixed in place as their respective connecting parts 15*a* and 16*a* are inner-molded to second base 3. Fixed contacts 17 and 18 are formed at the exposed parts of respective connecting parts 15*a* and 16*a* of connecting terminals 15 and 16.

Fixed contact 17 and 18 and movable contacts 27 and 30 that have been provided respectively on movable arms 12 and 14 are electrically connected when the protector is at standard operating temperature as are shown in FIGS. 1, 3 and 4.

It is noted that movable arms 12 and 14 have the same construction. In view of this fact, only a description of movable arm 12 as shown in FIGS. 10 (*a*), 10(*b*) and 10(*c*) is given.

Movable arm 12 is formed by joining a thin longitudinal plane member 25 and a thick plane member 26. In addition, a movable contact 27 is provided at the tip of plane member 26.

Thin plane member 25 is constructed of resilient spring material such as an alloy of beryllium and copper. On the other hand, thick plane member 26 is made of a metal with a low electric resistance-like copper, to cite an example.

Figure 10:
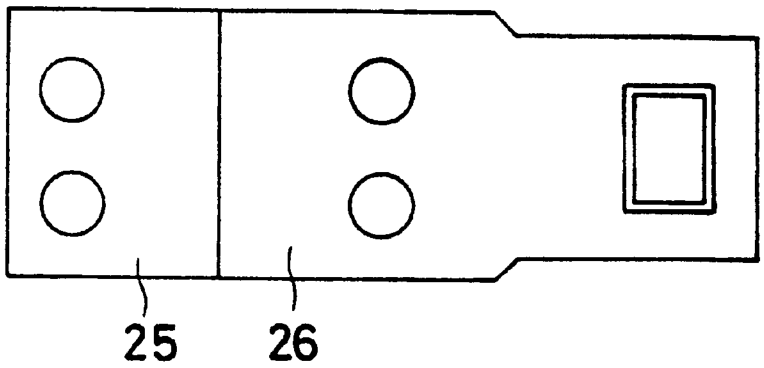
FIGS. 10(*a*), (*b*) and (*c*) are top, side and front views of a movable arm used in the motor protector device of FIG. 1.
Figure 10:
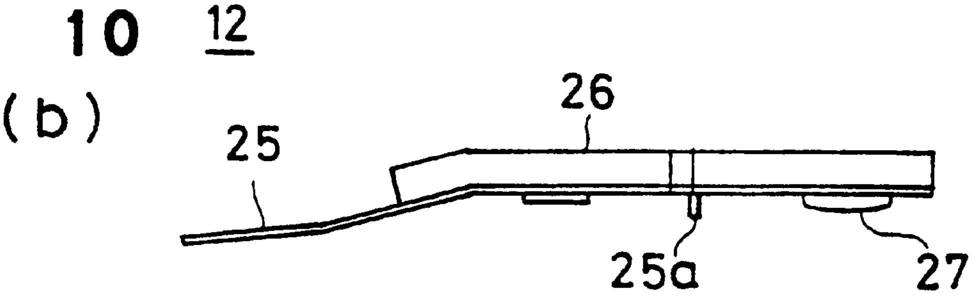
Figure 10:
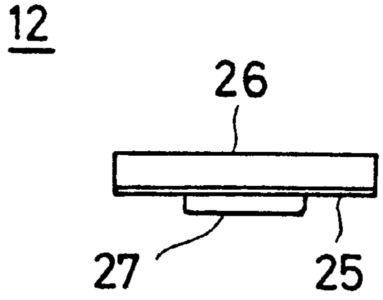

A bump or protuberant 25*a* is formed on the lower surface of plane member 25 and is positioned to be contacted by bimetal disk 11 as is shown in FIG. 10(*b*).

Movable arms 12 and 14 are fixed at one end to second base 3 by use of longitudinal connecting member 38 made of an electrically conductive material such as copper or the like which is insert-molded in second base 3. Accordingly, movable arms 12 and 14 are electrically connected through this connecting member 38.

Installation parts 31 and 32 for the installation of bimetal disks 11 and 13 are provided at the center of second base 3 as shown in FIGS. 1, 4 and 9. Each of installation parts 31 and 32 is shaped like a mountain rising from a cavity 33 that has been provided in second base 3. At the top of each installation part 31 and 32, there are provided raised circular portions 31*a* and 32*a* that are to be inserted into holes 11*a* and 13*a* of bimetal disks 11 and 13 respectively to secure bimetal discs to installation parts.

Bimetal disks 11 and 13 have a square shape as is shown in FIG. 1. Moreover, they are formed to have the shape of a cup as is shown in FIG. 4, with its convex surface facing movable arms 12 and 14 at the standard operation position.

When bimetal disks 11 and 13 which control the actuation of earlier described switches S2 and S3, snap over center, the protruding part 25*a* of each movable arm 12 and 14 is contacted by disks 11 and 13 respectively causing such arms to be pushed upward thereby opening switches S2 and S3 and cutting off electrical flow.

Preferably, in the above described embodiment, the temperature for snap-action of bimetal disk 11 is set at a temperature at or above 120 degrees centigrade with the reset temperature at below 60 degrees centigrade.

On the other hand, the temperature for snap-action of bimetal disk 13 is set at a temperature above that temperature set for bimetal disk 11 with the reset temperature set below the temperature seen by motor protector during normal motor operation. For example, bimetal disk 13 might have an actuation temperature of 130 degrees centigrade and a reset temperature of −30 degrees centigrade.

Bimetal disks 11 and 13 of these second and third switches S2 and S3 do not carry electric current as part of the circuit supplying power to the motor which is different from bimetal disk 8 of the first switch S1. Because of this fact, disks 11 and 13 more accurately reflect only the surrounding temperature with little effect of their temperature due to self-conductance.

Figure 11:
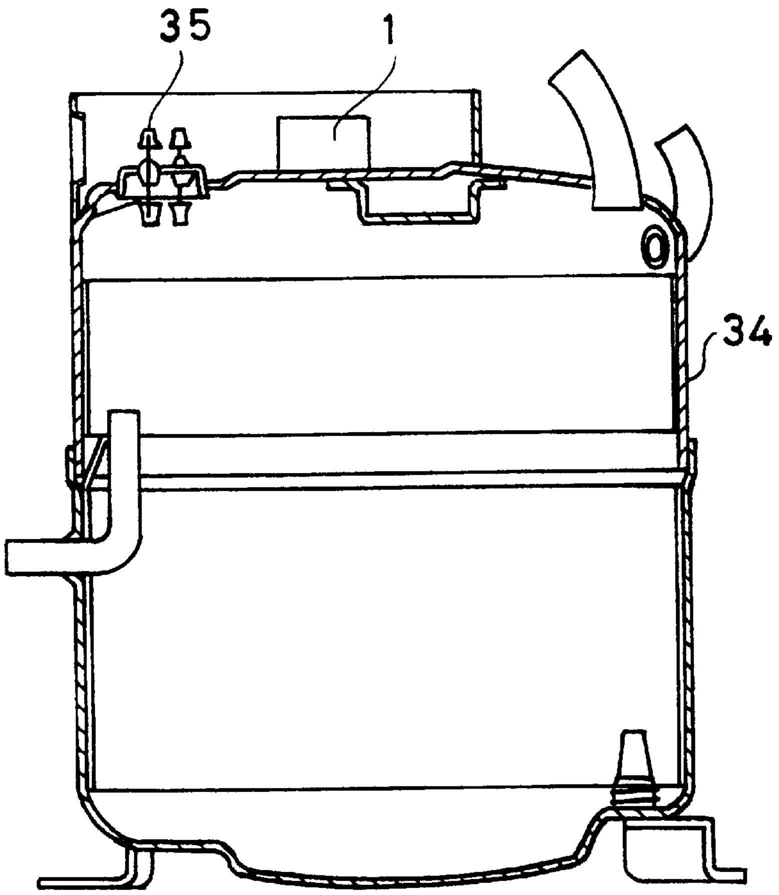
FIG. 11 is a diagrammatical cross-sectional view of a compressor with the motor protector of FIG. 1 mounted on it.

FIG. 11 shows a typical location of the installation of motor protector 1 to a compressor according to this invention. Motor protector 1 is installed by means of a bracket, etc., (not shown) directly adjacent compressor casing 34 with second base 3 contacting or nearly contacting casing 24. Additionally, it is typically installed in the neighborhood of sealed terminal 35 as is shown in FIG. 11.

Figure 12:
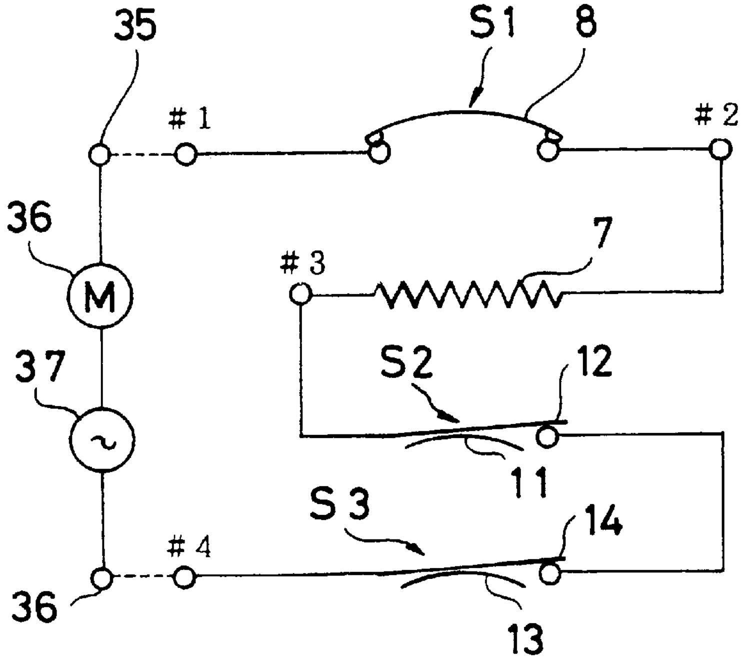
FIG. 12 is a circuit diagram for supplying power to a motor showing the electrical connection of the motor protector device of FIG. 1 in such a circuit.

FIG. 12 shows the circuit construction of the motor protector as described in this embodiment. As shown in FIG. 12, first switch S1 (bimetal disk 8) and heater 7, second switch S2 (bimetal disk 11 and movable arm 12) and third switch S3 (bimetal disk 13 and movable arm 14) are serially connected with driving power source 37 for motor 36.

In the motor protector of this embodiment, the electric current that flows from driving power source 37 to terminal no. 1 through a sealed terminal 35 of motor 36 flows to connecting terminal 36 through bimetal disk 8, terminal no. 2, heater 7, terminal no. 3, movable arm 12, movable arm 14 and terminal no. 4. Accordingly, this power supply circuit of motor 36 will be cut off in the case where any one of bimetal disks 8, 11 and 13 snaps over center thereby opening either one of switches S1, S2 and S3.

In accordance with this invention, it is desirable that the engineered life of various switches S1, S2 and S3 are constructed in such a way that switch S1 is designed to have a longer life than S2 and at least as long a life as switch S3. One of the factors determining the engineered life of a switch involves the life of the contacts used in the switch. To increase the life it is known to be desirable to increase the thickness of the silver that constitutes the contact. Accordingly, the silver contact of switch S1 is made the thickest and the silver contacts of switches S2 and S3 are made thinner. This is because of the fact that the opening and closing incidence of bimetal disk 8 of switch S1 is typically the highest and such a design will provide an optimum design.

Figure 13:
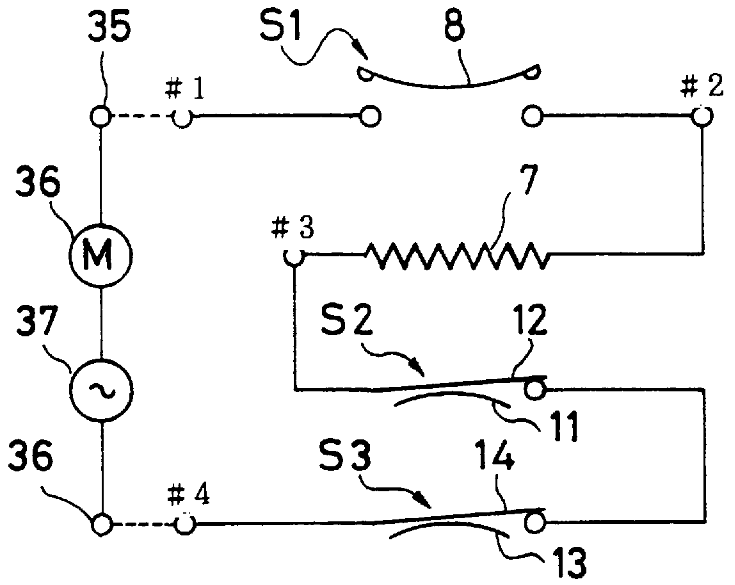
FIGS. 13(*a*), 13(*b*) and 13(*c*) are circuit diagrams similar to FIG. 12 showing respectively the states in which the first switch is open, in which the second switch is open and in which the third switch is open.
Figure 13:
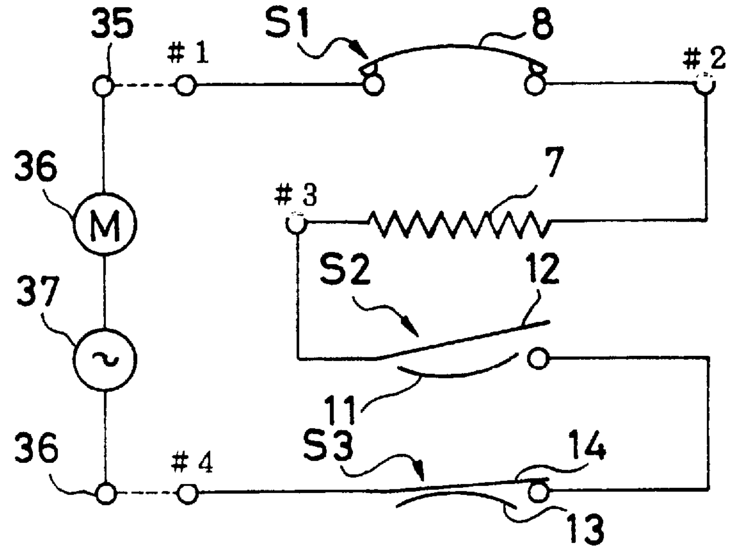
Figure 13:
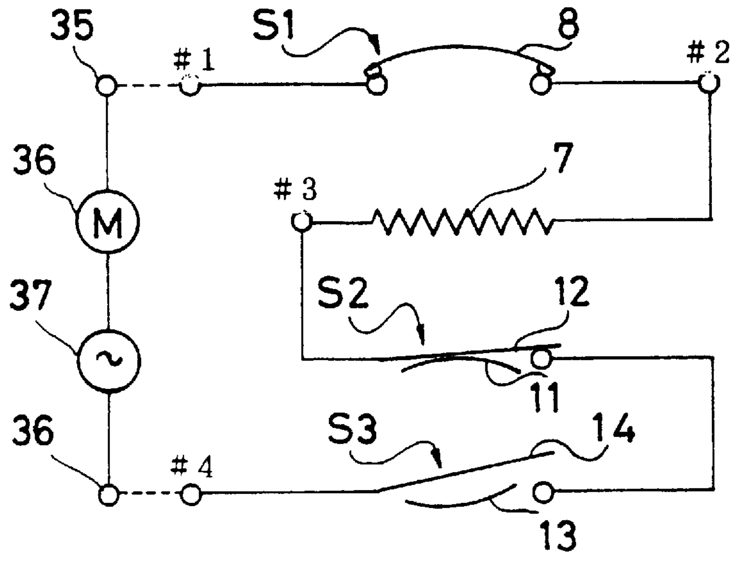

FIGS. 13(*a*) through (*c*) are explanatory figures describing the operation of motor protector 1 with FIGS. 13(*a*) showing the state in which switch S1 is open, FIG. 13(*b*) showing the state in which switch S2 is open and FIG. 13 (*c*) showing the state in which switch S3 if open.

In the case where motor 36 has been restrained or in the case where an excessive load has been added to motor 36, bimetal disk 8 will snap over center at the point when the pre-determined conditions have been met so as to cause the temperature of the disk to reach its actuation temperature resulting in movable contacts 8*a* and 8*b* disengaging with fixed contacts 4*a* and 5*a* as is shown in FIG. 13(*a*). Accordingly, the power supply circuit of motor 36 stops supplying current to the motor and the operation of the motor stops. The temperature of bimetal disk 8 is influenced by both the amount of current flowing through it and the temperature of its surrounding environment.

In the case of leakage of the gas of the compressor, on the other hand, a 5 the temperature of the surrounding atmosphere rises (even under normal motor operation) and at the time when the temperature reaches a set temperature such as, for example, 120 degrees centigrade, bimetal disk 11 snaps over center as is shown in FIG. 13(*b*). As a consequence of this action, bimetal disk 11 hits protuberant 25*a* that has been provided on movable arm 12 with a result that movable arm 12 is pushed up thereby breaking electrical contact between movable contact 27 of movable arm 12 and fixed contact 17 that has been provided on second base 2. The power supply circuit of motor 36 is then cut off and the operation of motor 36 stops.

At the end of the mechanical life of bimetal disk 8 or in the case where movable contacts 8*a* and 8*b* and fixed contacts 4*a* and 5*a* have joined due to melting, switch S1 is not cut off in the motor protector according to prior art with potential resulting damage to sealed terminal 35 of the compressor and the motor.

In such a case, however, with the use of motor protector 1 of the present invention, heat will be generated by the abnormal electric current that flows (in the range between 100A and 200A) in the power supply circuit so as to heat protector 1, and specifically bimetal disk 11, until it snaps over center opening switch S2. As a consequence, the power supply circuit of motor 36 is opened thereby terminating the operation of motor 36.

In the case where movable contact 27 of movable arm 12 and fixed contact 17 on second base 3 have also been joined due to arc welding, heat will be generated by the abnormal electric current that flows in power supply current so as to heat protector 1 and specifically bimetal disk 13 of switch S3 until it snaps over center at a set temperature such as, for instance, 130 degrees centigrade. As a result of this snap action, movable contact 30 of movable arm 14 and fixed contact 18 that has been arranged on second base 3 become separated with a consequence that the power supply circuit of motor 36 is "opened" and the operation of motor 36 stops. Since the reset temperature for bimetal disk 13 is below normal operating temperature for motor 36, for example 30 degrees centigrade, the disk will not reset except under abnormal operating conditions of extreme cold. Thus, the motor 36 is protected with no electricity flowing to it and will remain in that state. Even in the case where the movable contact 27 of the movable arm 12 and the fixed contact 17 have been joined by melting, there is no electricity flowing to the motor 36.

Figure 14:
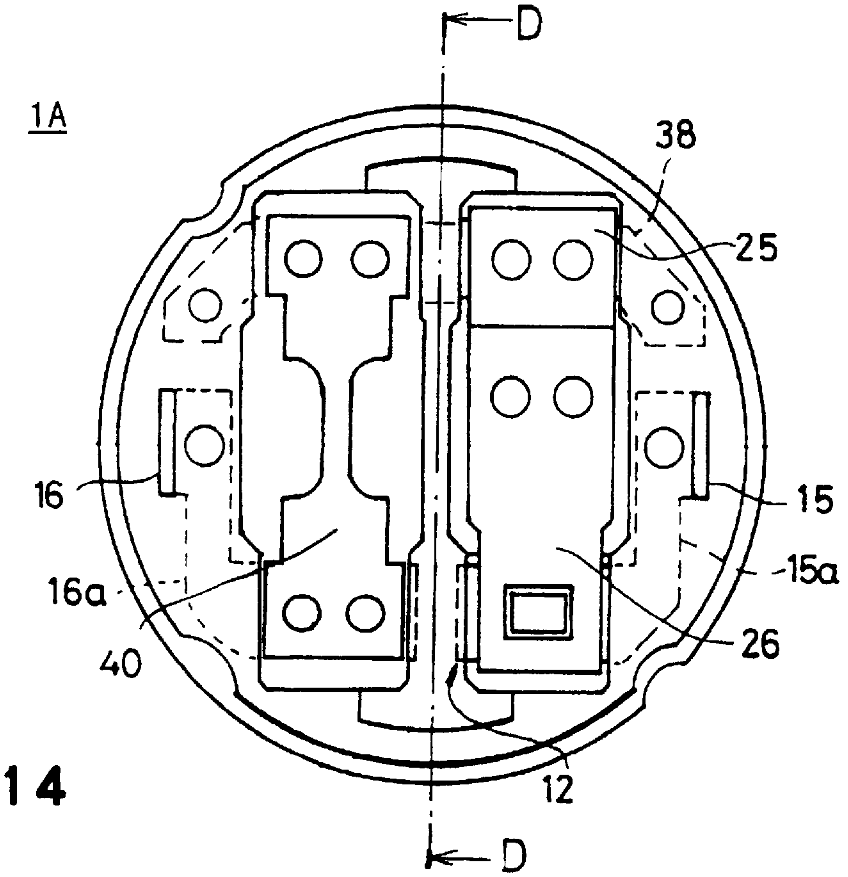
FIG. 14 is a bottom view showing the inside construction in a second embodiment of a motor protector according to this invention.
Figure 15:
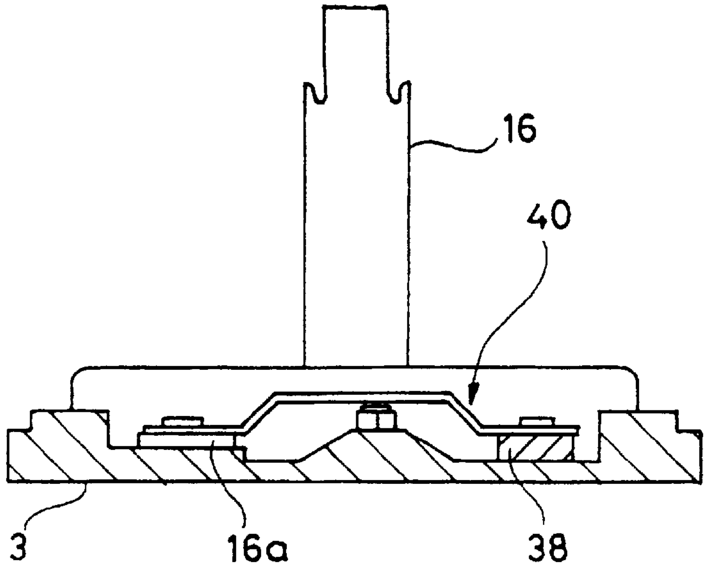
FIG. 15 is a cross-sectional view cut along line D—D of FIG. 14.
Figure 16:
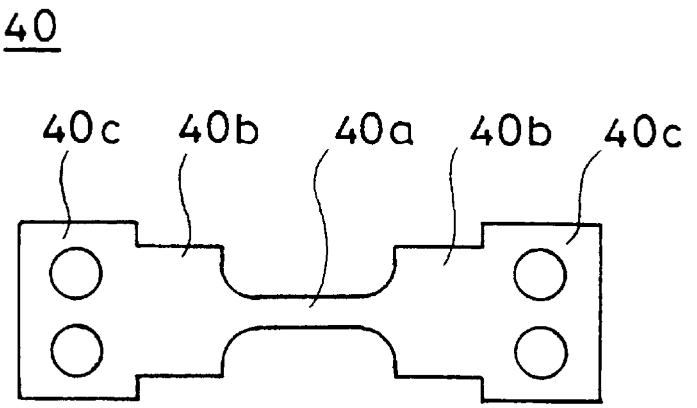
FIGS. 16(*a*) and 16(*b*) are top and side views of a fuse member used in the motor protector of FIG. 14.
Figure 16:
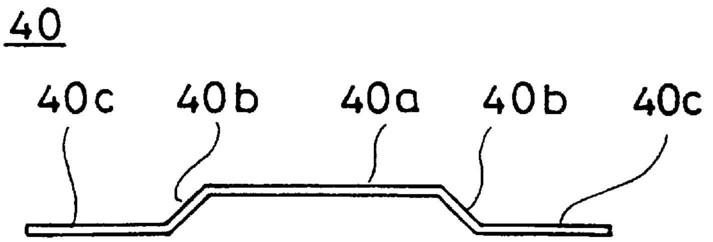
Figure 17:
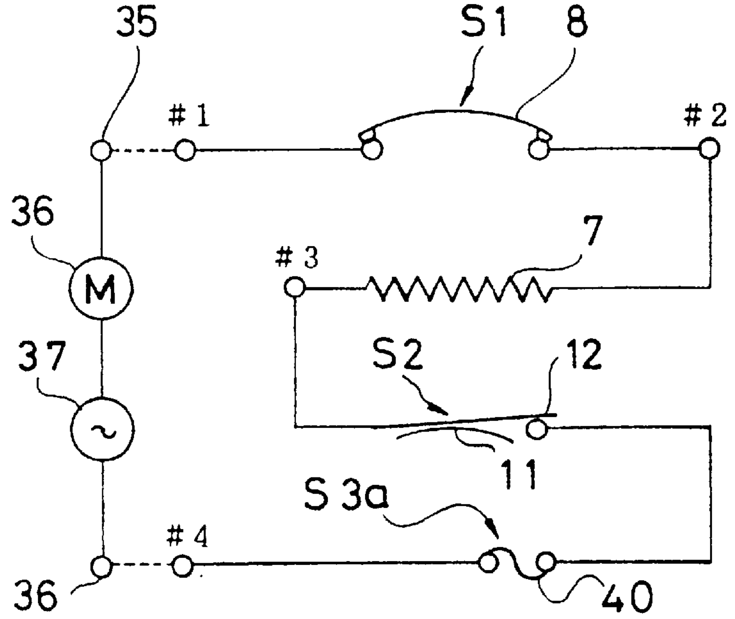
FIG. 17 is a circuit diagram for supplying power to a motor showing the electrical connection of the motor protector of the second embodiment in such a circuit.

FIGS. 14 and 17 show a second embodiment of a motor protector according to this invention; FIG. 14 is a bottom view showing the inner construction of this embodiment; FIG. 15 is a cross-sectional cut along line D—D of FIG. 14; FIG. 16(*a*) is a top view of the fuse used in this embodiment and FIG. 16(*b*) is a side view of the fuse of this embodiment; and FIG. 17 is a circuit diagram for supplying power to a motor showing the electrical connection of this second embodiment in such a circuit.

In motor protector 1A of this embodiment, there is provided a third switch S3*a* comprising a fuse 40 instead of the third switch S3 comprising a bimetal disk 13 and a movable arm 14 as shown in FIG. 14. All other parts of motor protector 1A are the same as for earlier described motor protector 1 using the same reference numerals unless otherwise stated.

This fuse 40 is a plate member made of a metal such as copper (Cu) or its alloy, for example, having a comparatively small electric resistance with one end thereof being electrically connected to the connecting member 38 and the other end connected to connecting part 16*a* of the connecting terminal 16. The reason for using a metal having a comparatively small electric resistance for fuse 40 lies in the desire to avoid the generation of heat in an amount which is more than necessary during normal operation of a motor to be protected.

As is shown in FIG. 16(*a*), this fuse 40 has a central long narrow melting part 40*a*. This melting part 40*a* is constructed so that the material used and its shape are determined to be destructed by melting in the case where a predetermined amount of current passes through it, to cite for example, 70 to 80 amperes.

On both sides of this melting part 40*a*, connecting parts 40*b* are integrally formed in a bent form and these connecting parts 40*b* are formed integrally with a pair of installation parts 40*c* on each end of fuse 40. Installation parts 40*c* of the fuse 40 are fixed with good electrical connection to connecting member 38 and connecting part 16*a* of connecting terminal 16 as is shown in FIG. 15.

In this embodiment, first switch (bimetal disk 8), heater 7, second switch S2 (bimetal 11 and movable arm 12) and third switch S3*a* (fuse 40) are serially connected to driving power source 37 for motor 36 above as is shown in Figure 17. The electric current that flows to terminal no. 1 from driving power source 37 through sealing terminal 35 of motor 36 flows to connecting terminal 36 through bimetal disk 8, terminal no. 2, heater 7, terminal no. 3, movable arm 12, fuse 40 and terminal no. 4. The power supply circuit of motor 36 that is to be protected is opened in the case where either bimetal disk 8 or bimetal disk 11 snaps over center thereby opening either switch S1 or S2.

In the case where motor 36 has been restrained by some reason or where an excess load has been added to motor 36, the temperature of bimetal disk 8 rises and it turns over center with a result that first switch S1 opens, and accordingly, the power supply circuit of motor 36 is cut and the operation of motor 36 stops.

In the case where the gas of the compressor has leaked, moreover, the bimetal disk 11 turns over at a prescribed temperature such as 120 degrees centigrade as described above for the first embodiment with a result that second switch S2 opens, the power supply circuit of motor 36 is cut off and the operation of motor 36 is terminated.

At the time when the mechanical life of bimetal disk 8 has come to its end or at the time when movable contacts 8*a* and 8*b* and fixed contacts 4*a* and 5*a* get fused due to melting or where movable contact 27 of movable arm 12 and fixed contact 17 on second base 3 get fused due to melting, the motor can short circuit. However, fuse 40 is designed to melt thereby opening third switch S3*a* and the power supply circuit of motor 36 is cut off. Motor 36 is then protected.

In accordance with this invention, third switch S3*a* can be set to melt by the electric current of a smaller value than the electric current value (100A to 200A) needed to actuate bimetal disk 11 in the first embodiment. The responsiveness of the fuse is quicker than that of bimetal disk 11 with a result that the power supply circuit can be cut off more quickly thereby providing better protection of motor 36.

In summary, motor protector 1 as described above provides for improved, highly reliable protection for a motor. With protector 1 made according to this invention, motor 36 is protected not only at the time of a restraint (locked rotor) or an over-load of motor 36 but also in the case of a leakage of the gas in the compressor.

Further with protector 1, when the bimetal disk 8 has come to the end of its mechanical life or when welding of the contacts due to melting takes place, not only in switch S1 but also in switch S2, current is terminated to motor 36 thereby preventing the damage to it and avoiding potentially dangerous situations.

Still further with motor protector 1, second and third switches S2 and S3 are provided on the second base 3 directly adjacent motor 36 to provide accurate and rapid response to the temperature of motor 36 for highly efficient motor protection.

Yet still further with motor protector 1, second base 3 is designed with a cavity portion 33 thereby reducing the thickness of the bottom wall of protector 1 in an area of protector 1 which is mounted directly adjacent the compressor so as to maximize heat flow from the motor to bimetal disks 11 and 13.

Still further with motor protector 1, significant design modifications are not needed to a prior art motor protector (101) to include a base 3 and switches S2 and S3. Also to this point, bimetal disks 11 and 13 are not formed integrally with the movable arms 12 and 14 but are formed separately in an electrically insulated state from the arms which makes it possible to minimize the resistance of movable arms 12 and 14 with a result that no adverse effect is given to the electric and temperature characteristics of the first switch S1.

Lastly, with motor protector 1, movable arms 12 and 14 have the same construction and heat-generating characteristics with the consequence that it becomes possible to modify the switch operating characteristics by merely changing the temperature characteristics of the bimetal disks 11 and 13.

It is to be understood that this invention is not to be limited to the forms of lo motor protector 1 and 1*a*, as described above, but various modifications are possible.

For example, a heater 7 is provided on first base 2. However, this invention is not limited to this construction and the heater 7 can be omitted. When no heater is used, there is a need to replace the electric current passageway of the heater 7 itself with something else. Therefore, it is desirable to connect the terminal numbers 2 and 3 with a member such as a copper wire whose resistance is low.

Moreover, there is no need to use the bimetal of the above described shape. Instead, bimetals of various other shapes can be used. In addition, the set temperature of each bimetal can be suitably modified provided that it is within the range/parameters of this invention.

In the form of the above described protector, the first switch is provided on the first base and the second and third switches are provided on the second base. However, this invention is not limited to this construction. It is possible to arrange the various switches at other locations inside the single casing if desired.

In addition, the motor protector, according to this invention, becomes most effective when applied to the compressor, etc., where cooling gas is employed. However, it can be used with other applications as well.

According to this invention which has been described above, a motor protector is provided for the protection of the motor by detecting a leakage of the cooling gas in addition to protection from restraint and overloading of the motor.

According to this invention, moreover, it becomes possible to avoid the ultimately dangerous situation even in the case where the contacts are joined by welding together or the primary actuation member(s) fail. Lastly, according to this invention, moreover, it is possible to use the conventional motor protector almost without any modification thereby making it possible to offer a motor protector with high detection ability and safety at low cost.

It should be understood that although preferred embodiments of the invention have been described in order to illustrate the invention, the invention includes various modifications and equivalents to the disclosed embodiment, only some of which have been mentioned above. It is intended that the invention include all such modifications and equivalents falling within the scope of the appended claims.

We claim:

1. A motor protector for monitoring a motor to be protected connected in a circuit for supplying electrical power to said motor comprising a first switch including an actuation means, said first switch connected in said circuit for supplying power to the motor and upon movement of said actuation means, the first switch opening and closing said circuit, a second switch connected in said circuit for supplying power to the motor including an actuation means for opening and closing said circuit and a third switch connected in said circuit for supplying electrical power to said motor including an actuation means for opening and closing said circuit, said actuation means of said first, second and third switches comprising a snap-acting bimetallic member responsive to temperature change each with a selected predetermined first temperature at which it snaps over center and a second lower selected predetermined temperature in which it snaps back to its original state, the selected predetermined first temperature of at least one switch of said first, second and third switches being different from the first selected predetermined temperature of the other switches of the first, second and third switches, and said first, second and third switches maintain said motor and being electrically connected in series.

2. A motor protector as set forth in claim 1 wherein said second and third switches include a switch arm movable in response to the snap action bimetallic member of each respective switch.

3. A motor protector as set forth in claim 1 wherein said snap-acting bimetallic member of the first switch is a current carrying member of the circuit for supplying current to the motor thereby being responsive to environmental temperature surrounding it and the amount of current passing through it, and said snap-acting bimetallic members of the second and third switches are not current carrying members of the circuit for supplying current to the motor and therefore are responsive only to environmental temperatures surrounding them.

4. A motor protector as set forth in claim 3 wherein said snap acting bimetallic members of the second and the third switch having different first selected predetermined snap temperatures with the first selected predetermined snap temperature for the bimetallic member of the third switch being higher than that of the bimetallic member of the second switch and the second selected predetermined snap temperature for the bimetallic member of the third switch being below the temperature of the motor protector during normal operation of the motor to be protected.

5. A motor protector as set forth in claim 4 wherein the second selected predetermined snap temperature for the bimetallic member of the third switch is about −30° C.

6. A motor protector as set forth in claim 1 wherein said first, second and third switches are all contained in a housing.

7. A motor protector as set forth in claim 6 wherein said housing comprises an upper first base member containing the first switch and a lower second base member containing the second and third switches.

8. A motor protector as set forth in claim 7 wherein the second and third switches are positioned in the housing closer to the motor to be protected than the first switch.

9. A motor protector as set forth in claim 7 wherein said second and third switches are contained in a cavity portion of said lower second base member to provide quicker and more accurate response to heat generated by the motor to be protected.

10. A motor protector for monitoring a motor to be protected connected in a circuit for supplying electrical power to said motor compromising a first switch including an actuation means, said first switch connected in said circuit for supplying power to the motor and upon movement of said actuation means, the first switch opening erred closing said circuit, a second switch connected in said circuit for supplying power to the motor including an actuation means for opening and closing said circuit and a third switch connected in said circuit for supplying electrical power to said motor including an actuation means for opening and closing said circuit, said actuation means for said first and second switches comprising a snap-acting bimetallic member responsive to temperature change for opening said circuit and said actuator means for said third switch comprising meltable fuse member responsive to temperature change for opening said circuit, the temperature of actuation of said actuation means of at least one switch of said first, second and third switches being different from the temperature of actuation of said actuation means of said other switches of the first, second and third switches, and said first, second and third switches maintain said motor and being electrically connected in series.

11. A motor protector as set forth in claim 10 wherein said first, second and third switches are all contained in a housing.

12. A motor protector as set forth in claim 11 wherein said housing comprises an upper first base member containing the first switch and a lower second base member containing the second and third switches.

13. A motor protector as set forth in claim 12 wherein the second and third switches are positioned in the housing closer to the motor to be protected than the first switch.

14. A motor protector as set forth in claim 13 wherein said second and third switches are contained in a cavity portion of said lower second base member to provide quicker and more accurate response to heat generated by the motor to be protected.

* * * * *

UNITED STATES PATENT AND TRADEMARK OFFICE

CERTIFICATE OF CORRECTION

PATENT NO. : 5,995,351
DATED : November 30, 1999
INVENTOR(S) : Hiromi Katsumata, Kenichiro Miura and Yuji Mori It is certified that error appears in the above-identified patent and that said Letters Patent is hereby corrected as shown below:

Title page,
Item [73] should read as follows:

-- [73] Assignee: Texas Instruments Incorporated
Dallas, Texas

Matsushita Electric Industrial Co., Ltd.
Osaka, Japan

Signed and Sealed this

Twenty-fifth Day of June, 2002

*Attest:*

JAMES E. ROGAN

*Attesting Officer*

*Director of the United States Patent and Trademark Office*